United States Patent
Eno

(10) Patent No.: US 11,243,804 B2
(45) Date of Patent: Feb. 8, 2022

(54) TIME TO LIVE FOR MEMORY ACCESS BY PROCESSORS

(71) Applicant: Micron Technology, Inc., Boise, ID (US)

(72) Inventor: Justin M. Eno, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 87 days.

(21) Appl. No.: 16/688,245

(22) Filed: Nov. 19, 2019

(65) Prior Publication Data

US 2021/0149711 A1  May 20, 2021

(51) Int. Cl.
*G06F 9/46* (2006.01)
*G06F 9/48* (2006.01)

(52) U.S. Cl.
CPC .................. *G06F 9/485* (2013.01)

(58) Field of Classification Search
CPC ........................................ G06F 9/485
See application file for complete search history.

(56) References Cited

U.S. PATENT DOCUMENTS

| | | | |
|---|---|---|---|
| 7,694,071 B1 | 4/2010 | Sidhu et al. | |
| 8,321,627 B1 | 11/2012 | Norrie et al. | |
| 9,740,485 B2 | 8/2017 | Mirichigni et al. | |
| 9,754,648 B2 | 9/2017 | Mirichigni et al. | |
| 9,952,850 B2 * | 4/2018 | Joshi | G06F 8/654 |
| 10,067,764 B2 | 9/2018 | Mirichigni et al. | |
| 10,163,472 B2 | 12/2018 | Mirichigni et al. | |
| 2005/0262323 A1 | 11/2005 | Woo et al. | |
| 2006/0253675 A1 | 11/2006 | Johannes Bloks | |
| 2007/0290993 A1 * | 12/2007 | Baudisch | G06F 3/0346 345/157 |
| 2008/0016308 A1 | 1/2008 | Bartley et al. | |

(Continued)

FOREIGN PATENT DOCUMENTS

EP    3605341    2/2020

OTHER PUBLICATIONS

International Search Report and Written Opinion, PCT/US2020/059843, dated Mar. 3, 2021.

(Continued)

*Primary Examiner* — Camquy Truong
(74) *Attorney, Agent, or Firm* — Greenberg Traurig

(57) ABSTRACT

Systems, apparatuses, and methods to implement time to live for memory access by processors. For example, a processor has a register configured to store a parameter specifying a time duration indicative of the desired time to live. A memory system has multiple components with different latencies for memory access. When the memory controller of the processor sends a command to the memory system to load an item from a memory address, the memory system can fail to provide, to the processor within the time duration, the item from the memory address currently being hosted in a first component. In response, the memory controller can send a signal to abort the command; and the memory system can select a second component having a memory access latency shorter than the first component, and change the hosting of the memory address from in the first component to in the second component.

16 Claims, 5 Drawing Sheets

(56) References Cited

U.S. PATENT DOCUMENTS

| | | |
|---|---|---|
| 2008/0091906 A1 | 4/2008 | Brittain et al. |
| 2010/0318691 A1 | 12/2010 | Kitagawa |
| 2014/0122814 A1 | 5/2014 | Mirichigni et al. |
| 2014/0122822 A1 | 5/2014 | Mirichigni et al. |
| 2014/0365706 A1* | 12/2014 | Tanaka ............... G06F 13/1626 |
| | | 710/308 |
| 2016/0070483 A1 | 3/2016 | Yoon et al. |
| 2017/0115891 A1 | 4/2017 | O'krafka et al. |
| 2017/0308382 A1 | 10/2017 | Mirichigni et al. |
| 2017/0309318 A1 | 10/2017 | Mirichigni et al. |
| 2018/0081563 A1 | 3/2018 | Roberts |
| 2018/0095675 A1* | 4/2018 | Kachare ............... G06F 3/0611 |
| 2019/0012173 A1 | 1/2019 | Mirichigni et al. |
| 2019/0079676 A1 | 3/2019 | Seo et al. |
| 2019/0080733 A1 | 3/2019 | Mirichigni et al. |
| 2021/0011649 A1 | 1/2021 | Doshi et al. |

OTHER PUBLICATIONS

International Search Report and Written Opinion, PCT/US2020/059844, dated Mar. 5, 2021.

* cited by examiner

TIME TO LIVE FOR MEMORY ACCESS BY PROCESSORS

FIELD OF THE TECHNOLOGY

At least some embodiments disclosed herein relate to processors and memory systems in general, and more particularly, but not limited to time to live for memory access by processors.

BACKGROUND

A memory sub-system can include one or more memory components that store data. A memory sub-system can be a data storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

A host system can communicate with a memory sub-system in accordance with a pre-defined communication protocol, such as Non-Volatile Memory Host Controller Interface Specification (NVMHCI), also known as NVM Express (NVMe), which specifies the logical device interface protocol for accessing non-volatile memory via a Peripheral Component Interconnect Express (PCI Express or PCIe) bus. In accordance with the communication protocol, the host system can send commands of different types to the memory sub-system; and the memory sub-system can execute the commands and provide responses to the commands. Some commands instruct the memory sub-system to store data items at addresses specified in the commands, or to retrieve data items from addresses specified in the commands, such as read commands and write commands. Some commands manage the infrastructure in the memory sub-system and/or administrative tasks, such as commands to manage namespaces, commands to attach namespaces, commands to create input/output submission or completion queues, commands to delete input/output submission or completion queues, commands for firmware management, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
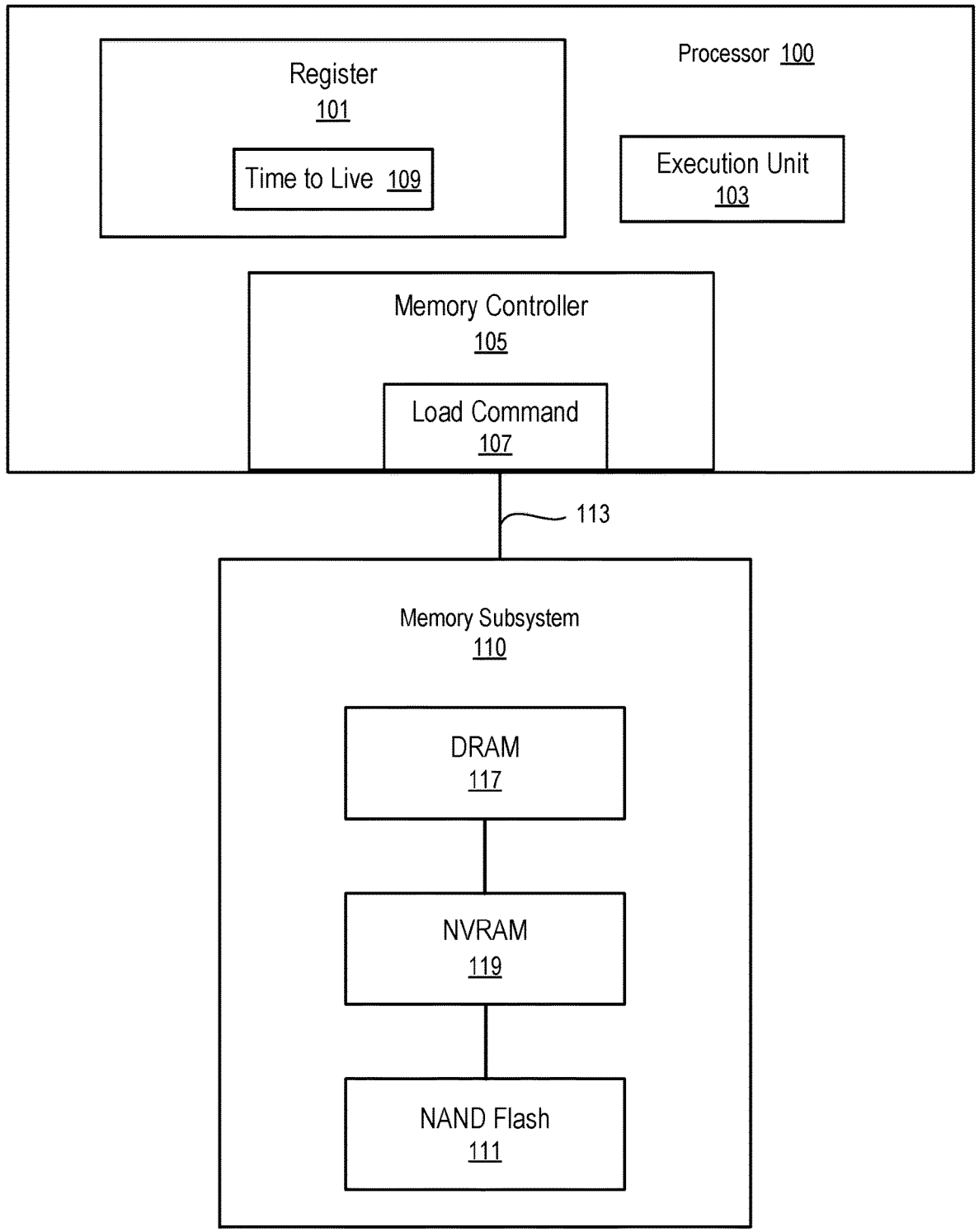
FIG. 1 shows a system having a processor controlling time to live for accessing a memory sub-system.

At least some aspects of the present disclosure are directed to time to live for processors to load data from memory devices.

For example, a parameter can be stored in a processor to indicate the desired time to live for loading data from a memory system for the processor. After the processor sends a load command to the memory system to load an item from a memory address, the memory system may or may not be able to provide the data from the memory address to the process within the desired time to live specified by the parameter, especially when the memory system has multiple memory components that have different latencies in memory access. If the processor determines that the memory system fails to provide the item from the memory address to the processor within the time duration specified by the time to live parameter, the processor can terminate its processing of the command in the processor and send a signal to the memory system to abort the command, instead of having to wait for the completion of the load operation on the low speed memory component.

In some implementation, the signal to abort the command causes the memory system to adjust the data hosting of the memory address. For example, the memory address can be moved from the low speed memory component in the memory system to the high speed memory component. For example, the data item at the memory address specified in the load command can be moved from the low speed memory component to the high speed memory component; and the memory address can be remapped from the low speed memory component to the high speed memory component. For example, the data item at the memory address specified in the load command can be retrieved from the low speed memory component and cached in the high speed memory component. When the memory system has more than two tiers of memory components of different access speeds, the memory system can select the high speed memory component for hosting the memory address based on the time gap between the load command and the signal to abort the command, which is indicative of the desired time to live of the processor. The high speed memory component can be selected to meet the desired time to live of the processor. Following the signal to abort the command and after at least a predetermined period of time sufficient for the memory system to adjust the data hosting of the memory address, the processor can resend the command to the memory system to load the item from the memory address. Since the memory system has adjusted the data hosting of the memory address to meet the desired time to live of the processor, the memory system can now provide the data from the memory address to the processor within the desired time to live of the processor. Between the signal to abort the command and resending the command, the processor can free the resource associated with the command such that the freed resource can be used to perform other operations.

For example, the memory system can have NAND flash, NVRAM, and DRAM that have different memory access speeds. If the memory system maps the memory address to a lower speed memory (e.g., NAND flash) and the processor aborts the load command in accordance with its time to live parameter, the memory system can relocate the item and the memory address to a higher speed memory (e.g., DRAM, NVRAM) from the lower speed memory (e.g., NAND flash) such that when the processor resend the load command, the memory system can provide the item form the memory address within the desired time to live of the processor.

Optionally, between the signal to abort the command and the resending of the command, the processor can send other commands to the memory system to load other items from the memory system. Such memory load operations with a time to live requirement provides the processor with the flexibility to optionally skip, or postpone, the processing of certain non-critical data (e.g., temporarily) without having to wait for an excessive amount of time. Alternatively, when the processing of the requested data is required or desirable (e.g., with minimal delay), the processor can optionally relax the time to live parameter.

The technique can improve the efficiency of resource usage during the processor accessing memory have different speeds.

FIG. 1 shows a system having a register 101 storing a time to live parameter 109 in the processor 100 for loading data from a memory sub-system 110. In FIG. 1, the memory subsystem 110 have different types of memory, such as dynamic random access memory (DRAM) 117, non-volatile random access memory (NVRAM) 119, and/or NAND flash memory (111). The different types of memory in the memory subsystem 110 can be addressed using a load command 107 specifying a memory address. In some implementations, the time to live parameter/requirement 109 is stored/specified in a processor 100 (e.g., a System on Chip (SoC) or a central processing unit (CPU)). For example, a register 101 can be used to store the time to live parameter/requirement 109; and the content of the register 101 can be updated to adjust the time to live requirement 109 of how much time the memory subsystem 110 has in providing the data at the specified memory address from the memory subsystem 110 to the processor 100.

For example, the processor 100 can have the one or more registers to hold instructions, operands and results. The processor 100 can further have one or more execution units (e.g., 103) to perform predefined operations defined in an instruction set. In response to execution of a load instruction, the memory controller 105 of the processor 100 can generate the load command 107 and transmit the load command to the memory subsystem 110. In response, the memory subsystem 110 retrieves data from one of the memory components (e.g., 117, 119, 111), and provides the data to the processor 100 over a memory bus 113.

For example, the memory address in the load command can be initially mapped by the memory subsystem 110 to a low speed memory (e.g., NAND flash 111). The desired time to live 109 can be shorter than the time required to retrieve the data from the low speed memory (e.g., NAND flash 111). Thus, before the memory subsystem 110 can provide the data to the memory controller 105 over the memory bus 113, the processor 100 determines that the memory subsystem 110 has failed to make the data available within the time to live 109 of the processor. In response, the processor 100 can abort execution of the instruction and/or the load command. For example, the memory controller 105 can send, over the memory bus 113, a signal to the memory subsystem 110 to abort execution of the command 107.

In some implementations, in response to receiving the signal to abort the command 107 from the processor 100, the memory subsystem 110 can be configured to change hosting of the memory address in a lower speed memory (e.g., NAND Flash 111) to hosting of the memory address in a higher speed memory (e.g., DRAM 117, NVRAM 119). Preferable, the higher speed memory (e.g., DRAM 117, NVRAM 119) has a memory access latency shorter than the lower speed memory (e.g., NAND Flash 111) and can meet the time to live 109 as indicated by the time gap between the load command 107 and the signal to abort the command 107.

For example, the abort signal can cause the memory subsystem 110 to complete loading the data from the lower speed memory (e.g., NAND flash 111), and instead of providing the data to the memory controller 105 through the memory bus 113, storing the loaded data into the higher speed memory (e.g., DRAM 117, NVRAM 119) (e.g., to buffer the data in the higher speed memory, to cache the data in the higher speed memory, or to remap the memory address to the higher speed memory by swapping a page of memory addresses from the lower speed memory to the higher speed memory).

For example, based on the signal to abort the command 107, the memory subsystem 110 can identify a desired latency for the item, select the higher speed component (e.g., DRAM 117, NVRAM 119) based on the desired latency, and remap the memory address to the higher speed component (e.g., DRAM 117, NVRAM 119).

In some implementation, the memory subsystem 110 can select the higher speed component (e.g., DRAM 117, NVRAM 119) based on the time gap between the receiving of the command 107 and the receiving of the signal to abort the command 107, which is indicative of the current time to live 109 of the processor 100.

The higher speed component (e.g., DRAM 117, NVRAM 119) can be selected to host or cache the memory address such that, after storing of the data item in the higher speed memory (e.g., DRAM 117, NVRAM 119), when the memory subsystem 110 receives the command 107 resent by the processor 100 to load the item from the same memory address, the memory subsystem 110 can provide the item from the higher speed component within a time period shorter than the time gap between the previous receiving of the command 107 and the receiving of the signal to abort the previously sent command 107.

Once the load command 107 that takes a time longer than the time to live 109 of the processor 100 to be executed in the memory subsystem 110 is aborted, the processor 100 can free up the relevant resource (e.g., the memory controller 105) for the execution of other instructions. For example, the memory controller 105 can be used to generate a second command for the memory subsystem 110 during the execution another load instruction; and the memory subsystem 110 can receive the second command sent from the processor 100 to load a second item from a second memory address. After the execution of the second command to provide the second item from the second memory address to the processor 100, the processor can resend the first command that was previously aborted; and the second command can be received and executed in the memory subsystem 110 between the transmitting of the signal to abort the first command and the resending of the first command.

Optionally, when the memory subsystem 110 fails to provide the item from the memory address to the processor 100 within the time duration corresponding to time to live 109, the processor 100 can optionally postpone the processing of the data/instruction at the memory address when the data/instruction is non-critical. Thus, the processor can reissue the load command 107 after a period of time, with the anticipation that the memory subsystem 110 is likely to make arrangements to make the data/instruction available according to the time to live 109. For example, the memory subsystem 110 can make the arrangements through buffering, caching, and/or changing a memory address map that maps the memory address to a physical memory address of a memory unit in the memory subsystem 110.

Figure 2:
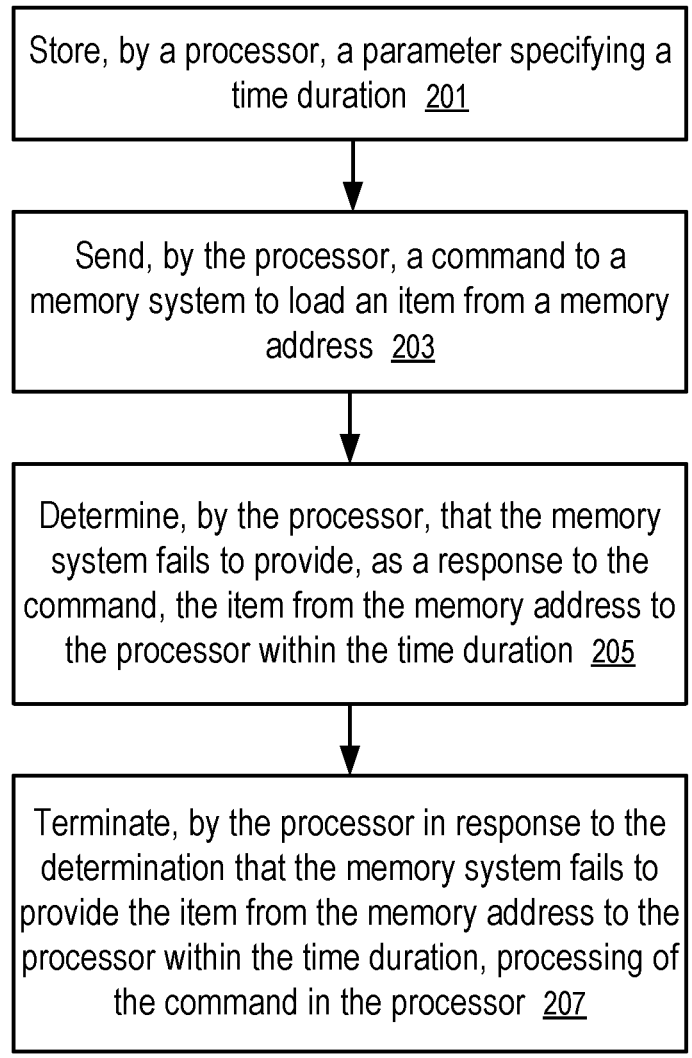
FIGS. 2 and 3 show methods of implementing time to live for a processor to load data from a memory sub-system.
Figure 3:
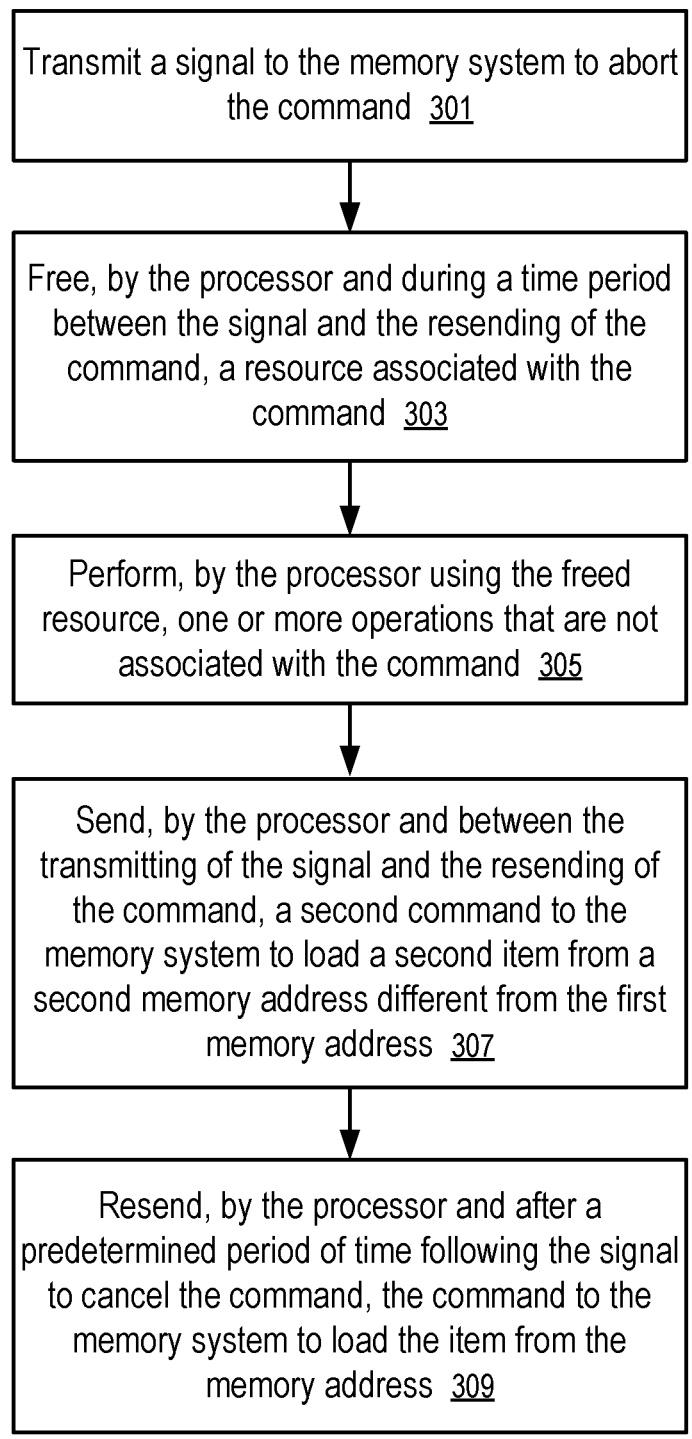

FIGS. 2 and 3 show methods of implementing time to live for a processor to load data from a memory sub-system. For example, the methods of FIGS. 2 and 3 can be performed in a system of FIG. 1 and, in general, by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 201, a processor 100 can store a time to live parameter 109 specifying a time duration. For example, the time to live parameter 109 can be stored in the register 101 in the processor 100.

At block 203, a processor 100 can send a command 107 to a memory subsystem 110 to load an item from a memory address. For example, the processor 100 can have the registers to hold instructions, operands and results. In some implementations, the processor 100 can have the execution unit 103 to perform predefined operations defined in an instruction set. When a load instruction in a register is executed, the memory controller 105 can convert a logical address in the load instruction into a physical memory address to generate the load command 107. The memory controller 105 sends the load command 107 over a memory bus 113 to the memory subsystem 110, and wait for a response from the memory bus 113 according to a predefined communication protocol for the memory bus 113.

At block 205, the processor 100 can determine that the memory system 110 fails to provide, as a response to the command 107, the item from the memory address to the processor within the time duration. For example, the memory address can be mapped to a memory component (e.g., 117, 119, or 111) among the multiple memory components 117 to 111 of the memory system 111. If the memory address of the data is currently mapped to the high-speed type memory device (e.g., DRAM 117, NVRAM 119), the data can be provided to the processor 100 within the time duration. However, if the memory address of the data is currently in the low-speed type memory device (e.g., NAND Flash 111), the memory system 110 can fail to provide the data to the processor within the time duration.

At block 207, when the processor 100 determines that providing the item identified via the memory address to the processor takes longer than the time duration specified in the parameter 109 in the processor, the processor 100 can terminate the processing of the command in the processor. For example, when the processor 100 determines that the data cannot be made available with the specified time, the processor 100 can terminate the operations.

After the processor 100 determines that providing the item identified via the memory address to the processor takes longer than the time duration, at block 301 of FIG. 3, the processor 100 can transmit a signal to the memory system 110 to abort the command 107.

At block 303, the processor 100 can free a resource (e.g., the memory controller) from the command 107 during a time period between the signal and the resending of the command.

At block 305, the processor 100 can perform one or more operations that are not associated with the command 107 using the above freed resource. For example, the processor 100 can execute further instructions, including one or more instructions to load data items that are hosted in the fast memory (e.g., 117 or 119) of the memory subsystem 110.

For example, the aborted command is a first command for retrieving data from a first memory address. At block 307, the processor 100 can optionally send a second command to the memory system to load a second item from a second memory address that is different from the first memory address. In this way, the processor can process other operations (e.g., the second command) instead of having to wait for the completion of the load operation on the low speed memory (e.g., the first command).

At block 309, the processor 100 can resend the command to the memory system to load the item from the memory address after at least a predetermined period of time following the signal to abort the command. In some implementations, the predetermined period of time is configured to be longer than a time period for the memory system to remap the memory address from the first component to the second component.

Figure 4:
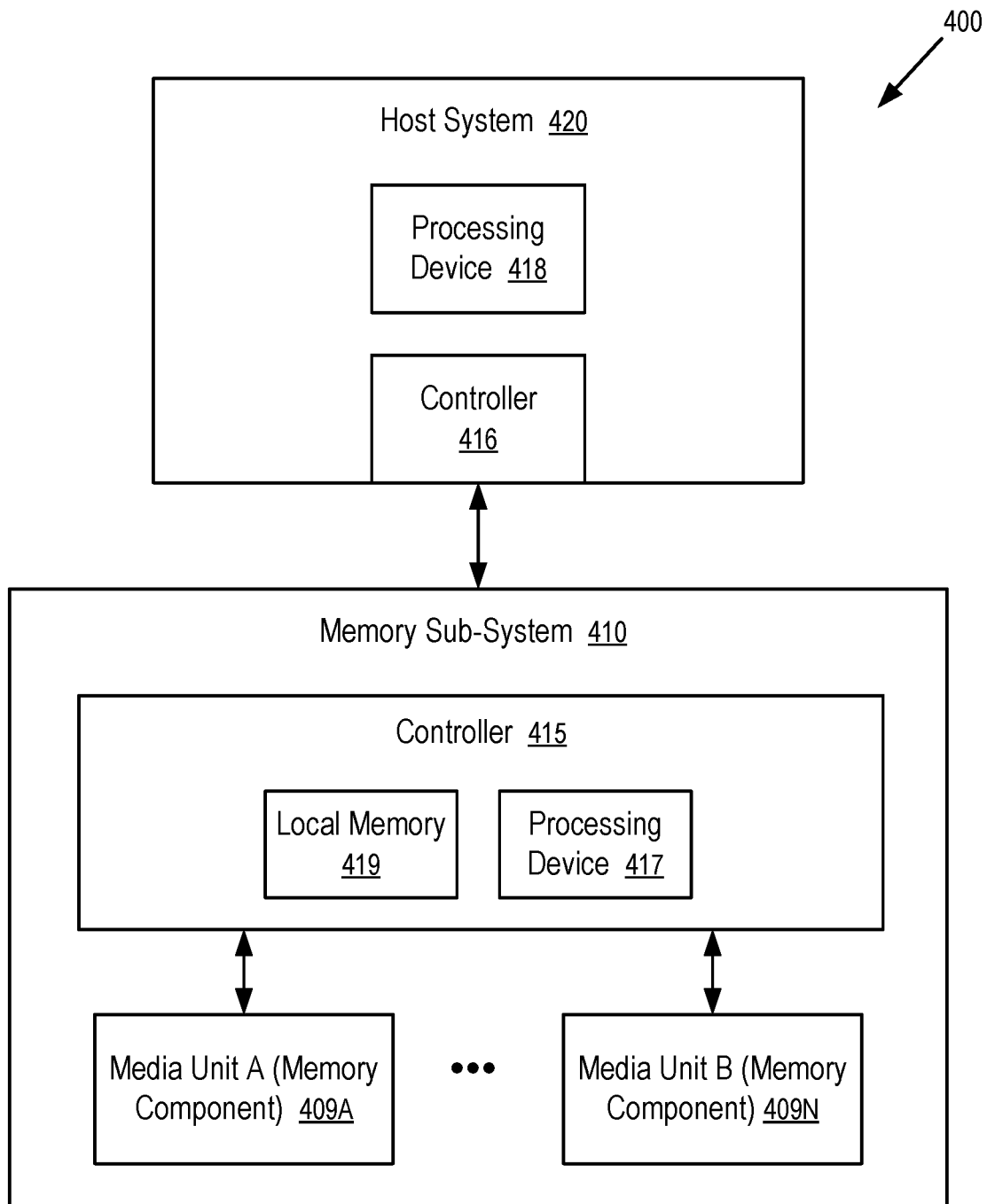
FIG. 4 illustrates an example computing system in which time to live techniques can be implemented.

FIG. 4 illustrates an example computing system in which time to live techniques can be implemented. For example, the time to live requirement 109 of FIG. 1 can be imposed in the processor 420 upon the time period between a memory sub-system 410 receiving a load command 107 and the memory sub-system 410 providing the data retrieved at the memory address specified in the load command 107.

In general, a memory sub-system can also be referred to as a "memory device." An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc.

Another example of a memory sub-system is a data memory/system that is connected to the central processing unit (CPU) via a peripheral interconnect (e.g., an input/ output bus, a storage area network). Examples of memory include a solid-state drive (SSD), a flash drive, a universal serial bus (USB) flash drive, and a hard disk drive (HDD).

In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

The memory sub-system 410 can include media, such as media units/memory components 409A to 409N. In general, the media units/memory components 409A to 409N can be volatile memory components, non-volatile memory components, or a combination of such. Each of the media units/ memory components 409A to 409N can perform operations to store, record, program, write, or commit new data independent of the operations of other media units/memory components 409A to 409N. Thus, the media units/memory components 409A to 409N can be used in parallel in executing write commands. In some embodiments, the memory sub-system is a storage system. An example of a storage system is a solid state drive (SSD). In some embodiments, the memory sub-system 410 is a memory module. Examples of a memory module includes a DIMM, NVDIMM, and NVDIMM-P. In some embodiments, the memory sub-system 410 is a hybrid memory/storage sub-system. In general, the computing environment can include a host system 420 that uses the memory sub-system 410. For example, the host system 420 can write data to the memory sub-system 410 and read data from the memory sub-system 410.

The host system 420 can be a computing device such as a desktop computer, laptop computer, network server, mobile device, or such computing device that includes a memory and a processing device. The host system 420 can include or be coupled to the memory sub-system 410 so that the host system 420 can read data from or write data to the memory sub-system 110. The host system 420 can be coupled to the memory sub-system 410 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 420 and the memory sub-system 410. The host system 420 can further utilize an NVM Express (NVMe) interface to access the memory components 409A to 409N when the memory sub-system 410 is coupled with the host system 420 by the PCIe interface. The physical host interface can provide an interface for passing control, address, data, and other signals between the memory sub-system 410 and the host system 420. FIG. 4 illustrates a memory sub-system 410 as an example. In general, the host system 420 can access multiple memory sub-systems via a same communication connection, multiple separate communication connections, and/or a combination of communication connections.

The host system 420 includes a processing device 418 and a controller 416. The processing device 418 of the host system 420 can be, for example, a microprocessor, a central processing unit (CPU), a processing core of a processor, an execution unit, etc. In some instances, the controller 416 can be referred to as a memory controller, a memory management unit, and/or an initiator. In one example, the controller 416 controls the communications over a bus coupled between the host system 420 and the memory sub-system 410.

In general, the controller 416 can send commands or requests to the memory sub-system 410 for desired access to memory components 409A to 409N. The controller 416 can further include interface circuitry to communicate with the memory sub-system 410. The interface circuitry can convert responses received from memory sub-system 410 into information for the host system 420.

The controller 416 of the host system 420 can communicate with controller 415 of the memory sub-system 410 to perform operations such as reading data, writing data, or erasing data at the memory components 409A to 409N and other such operations. In some instances, the controller 416 is integrated within the same package of the processing device 418. In other instances, the controller 416 is separate from the package of the processing device 418. The controller 416 and/or the processing device 418 can include hardware such as one or more integrated circuits and/or discrete components, a buffer memory, a cache memory, or a combination thereof. The controller 416 and/or the processing device 418 can be a microcontroller, special purpose logic circuitry (e.g., a field programmable gate array (FPGA), an application specific integrated circuit (ASIC), etc.), or another suitable processor.

In general, the media units/memory components 409A to 409N can include any combination of the different types of non-volatile memory components and/or volatile memory components. An example of non-volatile memory components includes a negative- and (NAND) type flash memory. Each of the memory components 409A to 409N can include one or more arrays of memory cells such as single level cells (SLCs) or multi-level cells (MLCs) (e.g., triple level cells (TLCs) or quad-level cells (QLCs)). In some embodiments, a specific memory component can include both an SLC portion and an MLC portion of memory cells. Each of the memory cells can store one or more bits of data (e.g., data blocks) used by the host system 420. Although non-volatile memory components such as NAND type flash memory are described, the memory components 409A to 409N can be based on any other type of memory such as a volatile memory. In some embodiments, the memory components 409A to 409N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative- or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 409A to 409N can be grouped as memory pages or data blocks that can refer to a unit of the memory component used to store data.

The controller 415 of the memory sub-system 110 can communicate with the memory components 409A to 409N to perform operations such as reading data, writing data, or erasing data at the memory components 409A to 409N and other such operations (e.g., in response to commands scheduled on a command bus by controller 416). The controller 415 can include hardware such as one or more integrated circuits and/or discrete components, a buffer memory, or a combination thereof. The controller 415 can be a microcontroller, special purpose logic circuitry (e.g., a field programmable gate array (FPGA), an application specific integrated circuit (ASIC), etc.), or another suitable processor. The controller 415 can include a processing device 417 (processor) configured to execute instructions stored in local memory 419. In the illustrated example, the local memory 419 of the controller 415 includes an embedded memory configured to store instructions for performing various processes, operations, logic flows, and routines that control operation of the memory sub-system 410, including handling communications between the memory sub-system 410 and the host system 420. In some embodiments, the local memory 419 can include memory registers storing memory pointers, fetched data, etc. The local memory 419 can also include read-only memory (ROM) for storing micro-code. While the example memory sub-system 410 in FIG. 4 has been illustrated as including the controller 415, in another embodiment of the present disclosure, a memory sub-system 410 cannot include a controller 415, and can instead rely upon external control (e.g., provided by an external host, or by a processor or controller separate from the memory sub-system).

In general, the controller 415 can receive commands or operations from the host system 420 and can convert the commands or operations into instructions or appropriate commands to achieve the desired access to the memory components 409A to 409N. The controller 415 can be responsible for other operations such as wear leveling operations, garbage collection operations, error detection and error-correcting code (ECC) operations, encryption operations, caching operations, and address translations between a logical block address and a physical block address that are associated with the memory components 409A to 409N. The controller 415 can further include host interface circuitry to communicate with the host system 420 via the physical host interface. The host interface circuitry can convert the commands received from the host system into command instructions to access the memory components 409A to 409N as well as convert responses associated with the memory components 409A to 409N into information for the host system 420.

The memory sub-system 410 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 415 and decode the address to access the memory components 409A to 409N.

Figure 5:
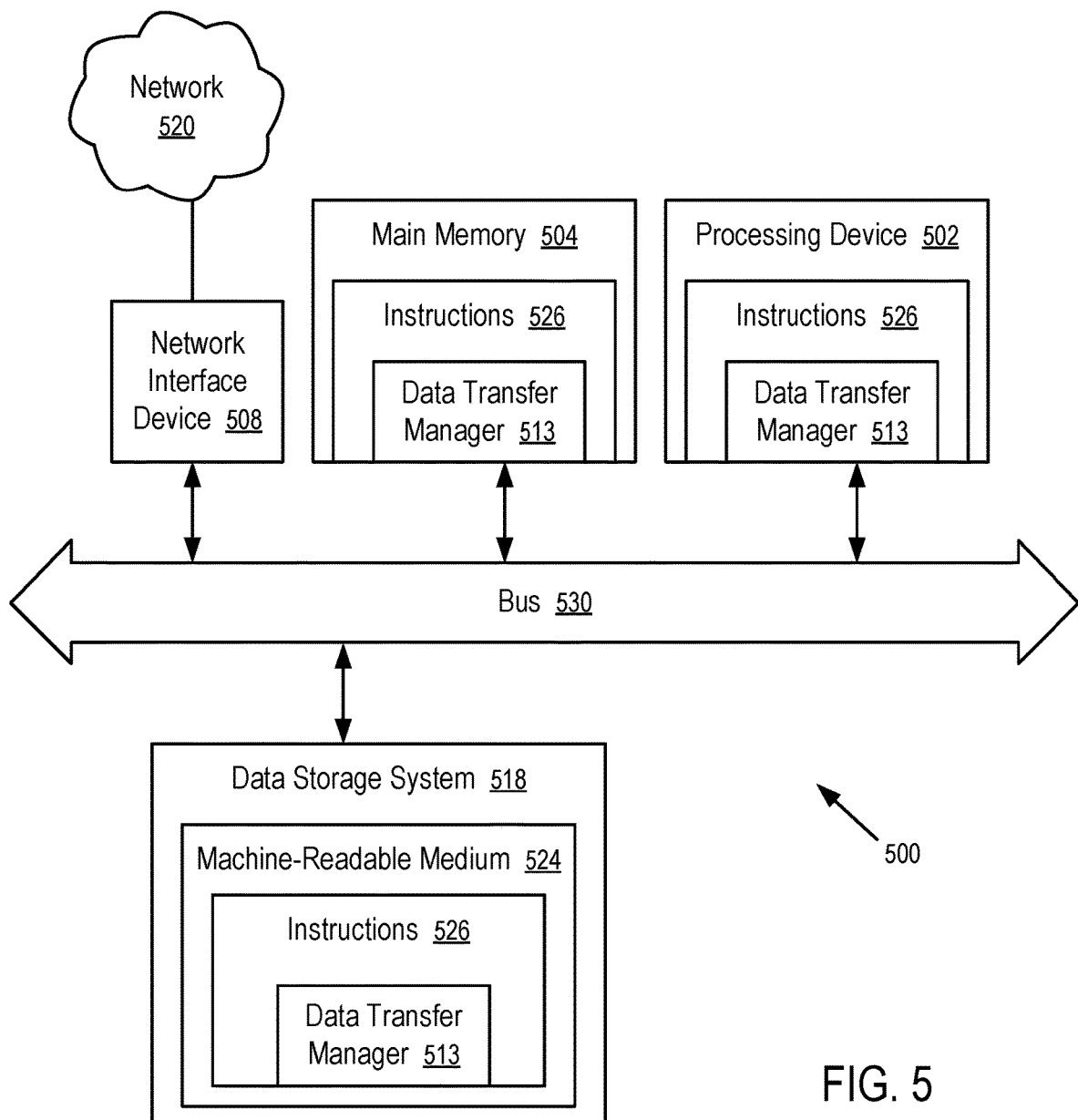
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed.

For example, at least some of operations configured to implement the time to live requirement and/or configured to implement a response according to the time to live requirement can be implemented using instructions stored as a data transfer manager 513.

In some embodiments, the computer system 500 can correspond to a host system (e.g., the host system 420 of FIG. 4) that includes, is coupled to, or utilizes a processor (e.g., the processor 502 of FIG. 5) or can be used to perform the operations of a data transfer manager 513 (e.g., to execute instructions to perform operations described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 518, which communicate with each other via a bus 530 (which can include multiple buses).

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 410 of FIG. 4.

In one embodiment, the instructions 526 include instructions to implement functionality corresponding to a data transfer manager 513 (e.g., to execute instructions to perform operations described with reference to FIGS. 1-4). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    storing, in a processor, a parameter specifying a time duration;
    sending, by the processor, a command to a memory system to load an item from a memory address;
    determining, by the processor, that the memory system fails to provide, as a response to the command, the item from the memory address to the processor within the time duration; and
    terminating, by the processor in response to a determination that the memory system fails to provide the item from the memory address to the processor within the time duration, processing of the command in the processor, the terminating including transmitting a signal to the memory system to abort the command, wherein based on the signal to abort the command, the memory system identifies a desired latency for the item, selects the second component based on the desired latency, and remaps the memory address to the second component.

2. The method of claim 1, wherein the memory system includes multiple components that have different latencies for memory access; and retrieval of items from a portion of the components requires a time period longer than the time duration identified by the parameter.

3. The method of claim 2, wherein the components include dynamic random access memory, non-volatile random access memory, and flash memory.

4. The method of claim 3, wherein in response to the signal to abort the command, the memory system relocates the item, from a first component in the multiple components, to a second component in the multiple components; and wherein the second component has a latency shorter than the first component.

5. The method of claim 1, further comprising:
resending, by the processor and after at least a predetermined period of time following the signal to abort the command, the command to the memory system to load the item from the memory address, wherein the predetermined period of time is configured to be longer than a time period for the memory system to remap the memory address from the first component to the second component.

6. The method of claim 5, further comprising:
freeing, by the processor and during a time period between the signal and the resending of the command, a resource associated with the command; and
performing, by the processor using the freed resource, one or more operations that are not associated with the command.

7. The method of claim 6, wherein the memory address is a first memory address, the method further comprising:
sending, by the processor and between the transmitting of the signal and the resending of the command, a second command to the memory system to load a second item from a second memory address different from the first memory address.

8. A method, comprising:
receiving, by a memory system, a command from a processor to load an item from a memory address, wherein the memory system includes multiple components that have different latencies for memory access; and the memory system maps the memory address to a first component of the multiple components;
retrieving, by the memory system, the item from the memory address hosted in the first component, wherein the processor stores a parameter specifying a time duration, and generates, in response to a determination that the memory system fails to provide the item from the memory address to the processor within the time duration, a signal to abort the command;
receiving, by the memory system from the processor, the signal to abort the command;
changing, by the memory system in response to the signal to abort the command, hosting of the memory address in the first component to hosting of the memory address in a second component via:
identifying, by the memory system, a desired latency for the item based on the signal to abort the command;
selecting, by the memory system, the second component based on the desired latency; and
remapping, by the memory system, the memory address to the second component; and
storing, by the memory system and in response to the signal to abort the command, the data item in the second component of the multiple components, wherein the second component has a memory access latency shorter than the first component.

9. The method of claim 8, further comprising:
selecting, by the memory system from the processor, the second component based on a time gap between the receiving of the command and the receiving of the signal to abort the command.

10. The method of claim 9, wherein the components include dynamic random access memory, non-volatile random access memory, and flash memory.

11. The method of claim 8, further comprising:
receiving, by the memory system, the command resent from the processor to load the item from the memory address after the storing of the data item in the second component; and
providing, by the memory system in response to the command resent from the processor, the item from the second component within a time period shorter than a time gap between the receiving of the command and the receiving of the signal to abort the command.

12. The method of claim 11, wherein the memory address is a first memory address, the method further comprising:
receiving, by the memory system, a second command sent from the processor to load a second item from a second memory address different from the first memory address, wherein the second command is received between the transmitting of the signal and the resending of the command; and
providing, by the memory system, the second item from the second memory address to the processor.

13. The method of claim 12, wherein the providing of the second item from the second memory address to the processor is at least in part concurrently with the storing of the data item in the second component.

14. A system, comprising:
a processor having:
a register configured to store a parameter specifying a time duration;
a plurality of execution units configured to execute instructions; and
a memory controller;
a memory system having multiple components that have different latencies for memory access; and
a memory bus coupled between the memory system and the memory controller;
wherein when the processor executes an instruction to load an item, the memory controller sends a command to the memory system to load an item from a memory address;
wherein in response to a determination that the memory system fails to provide, as a response to the command, the item from the memory address to the processor within the time duration, the processor is configured to abort execution of the instruction, and the memory controller is configured to send, over the memory bus, a signal to abort the command;
wherein in response to the signal to abort the command, the memory system is configured to change hosting of the memory address in a first component in the multiple components to hosting of the memory address in a second component in the multiple components, wherein the second component has a memory access latency shorter than the first component; and
wherein based on the signal to abort the command, the memory system is configured to identify a desired latency for the item, select the second component based on the desired latency, and remap the memory address to the second component.

15. The system of claim 14, wherein the multiple components include dynamic random access memory, non-volatile random access memory, and flash memory.

16. The system of claim 15, wherein the second component is selected based on a time gap between receiving of the command in the memory system and receiving of the signal in the memory system to abort the command.

* * * * *